United States Patent
Paolilli et al.

(10) Patent No.: US 9,561,886 B2
(45) Date of Patent: Feb. 7, 2017

(54) BARRIER LIDDING STRUCTURE BASED ON POLYPROPYLENE FILM

(75) Inventors: Tracy A. Paolilli, East Greenwich, RI (US); John J. Fitch, Middletown, RI (US); Roberto Siu, Providence, RI (US)

(73) Assignee: TORAY PLASTICS (AMERICA), INC., N. Kingstown, RI (US)

( * ) Notice: Subject to any disclaimer, the term of this patent is extended or adjusted under 35 U.S.C. 154(b) by 274 days.

(21) Appl. No.: 13/615,108

(22) Filed: Sep. 13, 2012

(65) Prior Publication Data

US 2013/0068768 A1    Mar. 21, 2013

Related U.S. Application Data

(60) Provisional application No. 61/537,447, filed on Sep. 21, 2011.

(51) Int. Cl.

| | | |
|---|---|---|
| *B32B 27/32* | (2006.01) | |
| *B32B 27/36* | (2006.01) | |
| *B32B 29/00* | (2006.01) | |
| *B32B 7/02* | (2006.01) | |
| *B32B 27/08* | (2006.01) | |
| *B32B 7/12* | (2006.01) | |
| *B65D 43/02* | (2006.01) | |
| *C09J 7/02* | (2006.01) | |

(52) U.S. Cl.
CPC ............ *B65D 43/02* (2013.01); *B32B 7/02* (2013.01); *B32B 7/12* (2013.01); *B32B 27/08* (2013.01); *B32B 27/32* (2013.01); *B32B 27/36* (2013.01); *B32B 29/00* (2013.01); *C09J 7/0296* (2013.01); *B32B 2307/31* (2013.01); *B32B 2307/7242* (2013.01); *B32B 2307/7244* (2013.01); *B32B 2439/00* (2013.01); *B32B 2439/40* (2013.01); *B32B 2439/70* (2013.01); *Y10T 428/24975* (2015.01); *Y10T 428/265* (2015.01)

(58) Field of Classification Search
None
See application file for complete search history.

(56) References Cited

U.S. PATENT DOCUMENTS

| | | | |
|---|---|---|---|
| 4,557,780 A * | 12/1985 | Newsome | ............... B32B 27/08 156/244.11 |
| 4,751,139 A | 6/1988 | Hensel et al. | |
| 4,795,665 A | 1/1989 | Lancaster et al. | |
| 5,888,599 A | 3/1999 | Bradt | |
| 5,981,625 A | 11/1999 | Zou et al. | |
| 6,616,998 B2 | 9/2003 | Greer et al. | |
| 2003/0180487 A1* | 9/2003 | Reighard | ............... B32B 27/08 428/34.2 |
| 2004/0019156 A1 | 1/2004 | Partenheimer | |
| 2004/0146730 A1* | 7/2004 | Holzer | ................. B29C 55/023 428/515 |
| 2005/0215694 A1* | 9/2005 | Kim | ...................... B82Y 30/00 524/445 |
| 2007/0254160 A1 | 11/2007 | Kravitz et al. | |
| 2008/0280113 A1 | 11/2008 | Iwatani et al. | |
| 2009/0004505 A1 | 1/2009 | Carespodi | |
| 2009/0017240 A1 | 1/2009 | Charbonnel et al. | |
| 2009/0162683 A1 | 6/2009 | Douard | |
| 2009/0169907 A1 | 7/2009 | Stadlbauer et al. | |
| 2009/0263600 A1 | 10/2009 | Miyashita et al. | |
| 2011/0076511 A1* | 3/2011 | Paolilli et al. | ................ 428/614 |
| 2011/0256274 A1 | 10/2011 | Longo et al. | |
| 2013/0068769 A1 | 3/2013 | Sharps et al. | |

OTHER PUBLICATIONS

Sharps et al., U.S. Office Action dated Oct. 25, 2013, directed to U.S. Appl. No. 13/535,270;14 pages.
Sharps et al., U.S. Office Action mailed May 9, 2014, directed to U.S. Appl. No. 13/535,270; 13 pages.
Sharps et al., U.S. Office Action mailed May 21, 2015, directed to U.S. Appl. No. 13/535,270; 16 pages.
Sharps et al., U.S. Office Action mailed Mar. 10, 2016, directed to U.S. Appl. No. 13/535,270; 12 pages.
Perry, Donna et al., "Foam Control in Aqueous Coatings," Dow Corning, 2004; 4 pages.
Breil, Jurgen, "Oriented film technology," Multilayer Flexible Packaging: Technology and Applications for the Food, Personal Care, and Over-the-Counter Pharmaceutical Industries, Chapter 11, Nov. 2009, pp. 119-136.
Paolilli et al., U.S. Office Action mailed May 10, 2016, directed to U.S. Appl. No. 14/289,415; 18 pages.

* cited by examiner

*Primary Examiner* — Sheeba Ahmed
(74) *Attorney, Agent, or Firm* — Morrison & Foerster LLP

(57) ABSTRACT

Multi-layer films suitable as sealable or peelable sheet that can be used for closing foodstuff containers are described. These multi-layer films includes a polymeric substrate layer and a seal or a peel-seal layer. The multilayer composite film preferably includes four component layers, namely in order, a polymeric base layer for mechanical strength, a thin organic barrier layer, an ethylene polymer-based adhesive layer, and a heat seal layer including an ethylene copolymer, such as ethylene vinyl acetate copolymer. The film is useful as a peelable heat sealable lid for containers of diverse polymer compositions storing various products such as foodstuffs and pharmaceuticals.

10 Claims, No Drawings

US 9,561,886 B2

BARRIER LIDDING STRUCTURE BASED ON POLYPROPYLENE FILM

REFERENCE TO RELATED APPLICATION

This application claims the benefit of U.S. Provisional Application Ser. No. 61/537,447, filed Sep. 21, 2011.

FIELD OF THE INVENTION

This invention relates to a barrier film for peelable container lids and a method of making such film. More specifically, it relates to a composite film including a polypropylene film coated with an organic barrier layer that provides excellent moisture and/or oxygen barrier, and forming a substantially completely peelable, high barrier multilayer film suitable for container lids.

BACKGROUND OF THE INVENTION

Peelable packaging films are frequently utilized in diverse container sealing applications. Primarily they are used to seal the mouths of foodstuff or medicine containers. In such applications, they provide closure of the mouth to prevent unintended loss of the contents. They also provide a solid, vapor, and liquid-tight barrier to prevent contamination and spoilage of the contents. In addition, being non-resealable once opened, they provide a security function by alerting the consumer whether the contents of a presumably unopened container have been potentially tampered with. Films intended for container sealing applications such as these are sometimes referred to as "lidding" films.

Conventional lidding films typically include at least two component layers. First, a base layer forms a mechanical closure preventing foreign substances from entering the container. Second, a seal layer which most commonly is thermally adhered to the circumference of the container mouth, provides a seal removable by peeling, preferably without tearing or leaving sealant material on the container. Many sophisticated modifications and additions to these basic components have developed to provide advantageous features to peelably lidded containers.

A particular disadvantage of many peelable-lidded containers is that the adhesion of the lidding film to the container is so strong that the film is difficult to remove from the container. Additionally, the strong adhesion can undesirably wholly or partially delaminate the lidding film leaving pieces of the film adhered to the lip of the container mouth. However, if the adhesion to the container mouth is made too weak, the lidding film can be removed inadvertently or prematurely by many incidental causes including, for example, pressure and movement of the contained material.

U.S. Pat. No. 6,616,998 and U.S. Pat. No. 5,888,599 disclose exemplary conventional peelable, sealable films used for lidding and packaging foods. These films are prepared using multi-step processes in which a core film is first prepared. This core film forms a base layer that is then coated with a hot melt adhesive in a separate step to form a skin layer, whose function is to provide a peelable heat seal.

In addition, other sealable films known in the art are coextruded. While these coextruded films are cost-effective to produce, the obtained films are not truly peelable as they often tear and split when removed from the package, often sticking to the food, especially to foods that contain sauces and cheese such as pizza.

A desirable beneficial feature of lidding films is inclusion of a highly effective moisture and/or gas barrier layer. Preparation of lidding films having thin barrier layers and desirable adhesive characteristics is usually difficult. It is particularly desirable to provide a multilayer lidding film having an organic barrier layer, which can be heat sealed to the mouth of diverse container compositions with a proper balance of adhesive characteristics. That is, the lidding film should bond firmly and durably to the container, be removable with moderate peeling force by the consumer and substantially completely peel from the container intact such that no lidding film residue is retained on the opened container.

SUMMARY OF THE INVENTION

The present invention provides a multilayer composite film having at least four main component layers, preferably in the following order, a polymeric base layer for mechanical strength, an organic thin barrier layer, an ethylene polymer-based adhesive layer, and a heat seal layer including an ethylene copolymer, such as ethylene vinylacetate copolymer. The heat seal layer can be applied by extrusion coating with or subsequent to applying the adhesive layer, however, care is preferably taken to prevent excessive heating that can degrade the heat seal polymer.

In some embodiments, a multilayer film is provided that includes (A) a polymeric base layer of thickness between 5 microns and 75 microns, (B) a barrier layer having vapor and/or moisture transmission resistant properties, preferable less than 1 cc/100 in$^2$/day or less for oxygen, tested at 65% relative humidity at 20° C., and less than 0.2 gm/100 in$^2$/day or less, for moisture, tested at 90% relative humidity at 100° C. This barrier layer, preferably is less than 1.5 microns thick, comprises a blend of ethylene vinyl alcohol and a polyvinyl alcohol aqueous solution and crosslinking and defoaming agents, and it is in direct contact with one side of the base layer, (C) an adhesion layer including polyethylene, such layer is preferably between 1 and 50 microns thick, and (D) a heat seal layer including a thermoplastically adhesive ethylene polymer selected from ethylene vinyl acetate copolymer (EVA copolymer) and blends of EVA copolymer with polyethylene, such layer preferably has a thickness of between 10 and 75 microns.

Some embodiments of a multilayer film may include a polymeric base layer, an organic barrier layer with a thickness of less than 1.5 microns of a surface of the base layer, an adhesive layer including an ethylene based polymer on a surface of the barrier layer; and a heat seal layer including an ethylene copolymer on a surface of the adhesive layer. The barrier layer may be formed from a blend including ethylene vinyl alcohol and polyvinyl alcohol. The barrier layer may further include crosslinking and defoaming agents. The base layer may have a thickness of 5-75 microns. The base layer may be mono or biaxially oriented. The adhesive layer may have a thickness of 1-50 microns. The heat seal layer may include an ethylene vinylacetate copolymer. The heat seal layer may further include polyethylene. The heat seal layer may have a thickness of 10-75 microns. The film may have an oxygen transmission rate (OTR) determined according to ASTM D-3985 of 1 cc/100 in$^2$/day or less, tested at 65% relative humidity at 20° C. The film may have a moisture transmission rate determined according to ASTM F-1249 of less than 0.2 gm/100 in$^2$/day or less, at 90% relative humidity at 100° C.

Some embodiments of methods of making a multilayer film may include: (A) providing a barrier composite including (i) a polymeric base layer, and (ii) a barrier layer having vapor and/or moisture transmission resistant properties, including an organic composition, wherein the barrier layer is in direct contact with one side of the base layer, (B) extrusion coating an adhesion layer including polyethylene, (C) providing a sealant composition including a thermoplastically adhesive, for example, ethylene polymer selected from ethylene copolymers with vinyl acetate EVA, acrylics such as methyl acrylate EMA, combinations of methyl acrylate and acrylic acid EMAAA, butyl acrylate EBA, both methyl acrylate and methacrylic acid EMAMAA, butyl acrylate and acrylic acid EBAAA. These acrylics and their blends with or without polyethylene may have a degradation temperature limit usually above 500 degrees F., above which the thermoplastically adhesive ethylene polymer reacts resulting in a tacky material that for smooth coatings results in film blocking or high friction or results in cross-linking that creates melt extrusion gels or plugging.

Some embodiments of methods of making a multilayer film may include providing a polymeric base layer, providing an organic barrier layer with a thickness of less than 1.5 microns on a surface of the base layer, extrusion coating an adhesive layer comprising an ethylene based polymer on a surface of the barrier layer, and coating a heat seal layer comprising an ethylene copolymer on a surface of the adhesive layer.

Some embodiments of a container may include: a container body having a lid sealant surface of a polymeric composition, and a lid including a multilayer film including (A) a polymeric base layer, (B) a barrier layer having vapor and/or moisture transmission resistant properties, including an organic compound, wherein the barrier layer is in direct contact with one side of the base layer, (C) an adhesion layer including oxidized polyethylene, and (D) a heat seal layer including a thermoplastically adhesive ethylene polymer selected from ethylene copolymers with vinyl acetate (EVA), or acrylics and methacrylics such as methyl acrylate (EMA), butyl acrylate (EBA), methacrylic acid (EMAA), mixed copolymers and their blends with or without polyethylene.

Some embodiments of a container may include a container body including a lid sealant surface, and a lid including a multilayer film. The multilayer film may include a polymeric base layer, an organic barrier layer with a thickness of less than 1.5 microns of a surface of the base layer, an adhesion layer including an oxidized polyethylene, and a heat seal layer including a thermoplastically adhesive ethylene polymer. The lid sealant surface may include crystallized polyethylene terephthalate (CPET), amorphous polyethylene terephthalate (APET), foil, polyethylene terephthalate-coated paperboard, PVC, glass, or aliphatic olefin polymers.

DETAILED DESCRIPTION OF THE INVENTION

Multi-layer films suitable as sealable or peelable sheets that can be used for closing foodstuff containers are described. These multi-layer films include a polymeric substrate layer and a seal or a peel-seal layer. Methods of making these multilayer films and containers including these films are also described.

The multilayer composite films preferably include four component layers, namely in order, a polymeric base layer for mechanical strength, a thin organic barrier layer, an ethylene polymer-based adhesive layer, and a heat seal layer including an ethylene copolymer, such as ethylene vinyl acetate copolymer.

The heat seal layer can be applied to a barrier composite including the polymeric base layer and the barrier layer by extrusion coating, with or subsequent, to applying an adhesive layer. This extrusion coating is preferably applied under conditions that prevent excessive heating that can degrade the heat seal polymer.

The film is useful as a peelable heat sealable lid for containers of diverse polymer compositions storing various products such as foodstuffs and pharmaceuticals. The heat seal layer provides the film with the ability to be heat-sealed to itself or to other films, sheets, or trays made from crystallized polyethylene terephthalate (CPET), amorphous polyethylene terephthalate (APET), foil, PET-coated paperboard, PVC, glass, polypropylenes or polyethylenes, polylactic acid, polystyrenes (PS), or other polyolefins at temperatures ranging from 50 to 200° C. The heat seal layer can be formulated to provide either a film destruct bond, or preferably a peelable bond to the other material. The preferred seal range for this layer (to itself or to other substrates) is between 300 gm/in to 3,000 gm/in (based on sealing at 275 degrees F., 30 psia, 0.5 seconds dwell). This layer's thickness is preferably between 10 and 75 microns.

The base layer provides structural integrity of the film and support for the other layers. The base layer may be a barrier film such as cast polypropylene, oriented polypropylene, aluminum foil, oriented polyester or any other barrier substrate. The base layer may also optionally include organic or inorganic particulates for various purposes such as to facilitate winding and handling of the film, or to enhance the mechanical and optical properties of the film, including reduction of the density of the film via cavitation. Representative examples of such particulate additives to the base layer are amorphous silica, calcium carbonate, clay, talc, diatomaceous earth, cross-linked spherical polymers such as poly(dimethylsiloxane), glass beads or mixtures of two or more of these. Moreover, to reduce material costs the base layer can optionally include a filler or extender component, such as regrinded recycled layer or film composition, or any other polymeric composition having suitably compatible processing and physical properties. This layer's thickness is preferably between 5 and 75 microns.

The base layer can be stretched in one or two orthogonal directions, i.e., for mono- or biaxial orientation. This treatment provides greater strength for the layer, and thus also for the overall film. It also permits the film to be produced to a thinner cross section dimension.

The barrier layer imparts enhanced liquid and/or gas barrier properties to the film. Oxygen transmission rate (OTR) may be determined via the procedure of ASTM D-3985. The multilayered film preferably has an OTR of less than 1 cc/100 in$^2$/day or less, tested at 65% relative humidity at 20° C. Moisture transmission rate (MVTR) may be determined via the procedure of ASTM F-1249. The multilayered film preferably has a MVTR of less than 0.2 gm/100 in$^2$/day or less, tested at 90% relative humidity at 100° C. This layer's thickness is preferably less than 1.5 microns.

The barrier layer may be applied or coated on the base layer by known methods. Solution coating the barrier layer on the base layer is a preferred method. Other liquid or extrusion coating methods may also be utilized.

As will be further explained, sealing of the lid formed by the film to a storage container may be achieved by a thermally activated bond between the outer, heat seal layer of this film and the container mouth. For effective peel performance when the consumer removes the lid, it is preferred that the strength of the bond between the heat seal layer and the underlying barrier layer is robust and durable. Selection of the adhesion layer and the method of incorporating it into the multilayer film have been developed to advantageously produce such adhesion very efficiently.

Preferably the adhesive layer is made up of greater than 50 weight % ethylene-based polymer which can be an ethylene homopolymer or copolymer or blend thereof. This layer's thickness is preferably between 1-50 microns. If a copolymer, the comonomer content is preferably a minor fraction, less than 20 weight %, preferably less than 10 weight %. The comonomer is preferably a carboxylic acid-containing moiety, such as for example, methacrylic acid and acrylic acid. Effective adhesion of the multilayer film composite layers is preferably achieved by thermally activated reaction of primarily carboxylic acid functional groups of the adhesive layer polymer with the primer. A mechanism for generating reactive carboxylic acid functional groups is oxidizing the ethylene of the adhesive layer. Preferably, the extrudate should be in the range of about 249° C.-335° C. (480° F.-635° F.) for oxidation of polymeric ethylene to occur. If the temperature is higher than the preferred range, the ethylene polymer can degrade excessively, losing molecular weight and strength. If the temperature is lower than the preferred range, the ethylene polymer will not adequately oxidize to produce carboxylic acid functional groups.

It is also possible to utilize carboxylic acids that have been introduced into the adhesive layer via the carboxylic acid-containing moiety of the comonomers. Because the carboxylic acid functional groups are present in the comonomers, they are available for reaction directly with a primer without oxidation.

The primer may be used to facilitate bonding of the seal layer. This primer may be water-based or solvent based. An example of a primer that may be used is a 1 wt % solution of a water based, modified polyethylenimine resin dispersion that can be applied to a freshly corona treated polyester layer at an application weight of 0.62 g/sq-m on a wet solution basis. The corona treatment is an electrical treatment (such as plasma or corona) that provides specific surface tension properties to the base polyester film. The desired applied watt density for this layer could be in range of 0.5 to 5 watts/square feet/min, more specifically in the range of 0.5 to 3 watts/square feet/min. The primer coating can be dried in a convective oven at about 160 F to give a theoretical dry coating weight of about 1% of the wet weight.

Accordingly, extrusion temperatures in the low end of the range for oxidation just mentioned can be used (namely between 480° F. and 600° F.). Such extrusion temperatures in the lower portion of the range are beneficial additionally because the carboxylic acid-containing copolymers tend to crosslink at higher temperatures. Although the carboxylic acid functional groups are present in the ethylene copolymer without high temperature oxidation, enough heat should be available to drive the reaction of the acid group with the amine group. Thus, as the extrusion temperature is lowered, processing conditions can be controlled to retain extrudate heat for reaction. Such control can be implemented, for example, by increasing thickness of the adhesive layer and/or lowering extrusion die height above the primer-coated substrate layer. However, when a very thin adhesive layer is desired, a higher adhesive layer extrusion temperature may be used to drive the reaction with the primer.

The adhesive layer may be applied using known techniques, such as extrusion coating.

The heat seal layer (sometimes referred to as the skin layer) may include a thermally activatable adhesive composition, typically referred to as hot melt adhesive resin. The skin layer provides the film with the ability to be heat-sealed to itself or to other films, sheets, trays or other substrates. These other materials are typically made from crystallized polyethylene terephthalate (CPET), amorphous polyethylene terephthalate (APET), foil, polyethylene terephthalate-coated paperboard, PVC, glass, aliphatic olefin polymers such as polypropylene and polyethylene, and other polyolefins such as polystyrene (PS) and the like.

The preferred hot melt, thermally activatable adhesive composition includes polymers selected from polyethylene homopolymer such as low density polyethylene (LDPE) and medium density polyethylene (MDPE), copolymer of ethylene and at least one ethylenically unsaturated comonomer selected from vinyl acetate, acrylic acid, $C_1$-$C_4$ alky ester of acrylic acid, $C_1$-$C_4$ alkyl ester of a $C_1$-$C_4$ alkylacrylic acid, and cyclic olefin copolymers and blends thereof. Representative examples of copolymer of ethylene and ethylenically unsaturated comonomer include ethylene/vinylacetate copolymer (EVA), ethylene/acrylic acid copolymer (EAA) ethylene/methyl acrylate copolymer (EMA), ethylene/methylmethacrylate copolymer (EMMA), ethylene/methyl acrylate/acrylic acid copolymer (EMAAA), ethylene/methyl acrylate/methacrylic acid copolymer (EMAMAA), and ethylene/butyl acrylate/acrylic acid copolymer (EBAAA).

The heat seal layer composition can be modified by addition of organic or inorganic particulates for various purposes. Representative examples of such additives include amorphous silica, calcium carbonate, clay, talc, diatomaceous earth, cross-linked spherical polydimethylsiloxane, cross-linked spherical organic polymers, or glass beads or mixtures of two or more of these ingredients; slip agents such as but not limited to a fatty amide: erucamide, stearamide, behenamide, or bisamides (e.g. stearyl-erucamide), silicone oil, mixtures of same; anti-fog agents such as, but not limited to glycerol monostearate; and anti-static agents such as, but not limited to glycerol monostearate. The heat seal layer can be monolithic or it can be formed from two or more strata. A stratified heat seal layer can be free of certain additives in sub-layers, i.e., those closer to the adhesive layer and additives in the outermost stratum. For example, slip agent particulates can be incorporated into the outermost stratum of the heat seal layer to reduce blocking of the film and promote ease of film handling.

This particular seal layer can also be modified by an electrical treatment (such as plasma or corona) to provide specific seal properties to specific substrates. The desired applied watt density for this layer could be in range of 0.5 to 5 (watts/square feet/min).

Certain additives are useful in modifying properties other than sealing properties of the peelable blend. Examples of some of the properties which can be modified are UV stability, thermal stability and color.

The extrusion coated seal layer is applied as a molten resin curtain onto the base polymeric film. The temperature range of this molten resin curtain depends on the type of resin used but generally is between 175 degrees C. and 350 degrees C. This molten curtain is cooled as soon as it contacts the polymeric film since a chill roll supports the base film. The chill roll is usually kept at temperatures between 50 degrees C. and 20 degrees C. The extrusion coated sealant of this invention will have thickness that ranges from 10 microns to 75 microns. More specifically from 10 microns to 50 microns, more specifically from 10 to 25 microns.

These lidding films/articles may be used to seal the mouths of containers, for examples foodstuff or medicine containers. In such applications, they may provide closure of the mouth to prevent unintended loss of the contents. They also provide a solid, vapor, and liquid-tight barrier to prevent contamination and spoilage of the contents. Many packaging machines known in the art are widely used in these applications, machines such as Raque, Multivac, or Preferred Packaging model OMNI IDX-E are examples of these packaging machines. These films are usually heat sealed unto the foodstuff or medicine container using a platen or drum heat sealer. The normal heat seal parameters for these lidding articles are between 200 F and 450 F, more preferable between 275 F and 400 F, more preferably between 300 F and 300 F.

Test Methods

Sealing strength of the lidding article was measured as following. The seal layer is sealed to a rigid substrate such as a CPET or Polypropylene tray using a Sentinel heat sealer. The heat seal conditions are 300-325° F. (177° C.) temperature, 0.5 seconds dwell time, and 30 psi (ca. 0.207 N/mm$^2$) jaw pressure, 1 heated jaw. Prior to peeling, the sealed materials are cut so that each web can be gripped in a separate jaw of the tensile tester and a 1'×⅜" (305 mm×9.5 mm) section of sealed material can be peeled. The two surfaces are peeled apart on an Instron tensile tester in a 90° configuration known as a T-peel. The peel is initiated at a speed of 2"/minute (ca. 51 mm/min) until 0.5 lbsf (2.22 N) of resistance is measured to preload the sample. Then the peel is continued at a speed of 6"/minute (ca. 152 mm/min) until the load drops by 20%, signaling failure. The maximum recorded load prior to failure is reported as the seal strength.

This invention will be better understood with reference to the following examples, which are intended to illustrate specific embodiments within the overall scope of the invention.

Example 1

A 120 gauge (30 µm) coex polypropylene film (Toray's DR22 OPP) was extrusion coated with a peelable seal layer, based on Ateva's 1943 EVA, as described herein. The sealant layer's thickness was 56 gauge (14 µm) for a total structure thickness of 176 gauge (45 µm). The moisture vapor barrier of this film was 0.14 cc/100 square inches/day.

Example 2

A 80 gauge (20.5 µm) barrier coex polypropylene film (Toray's CBS-2 OPP) was extrusion coated with a peelable seal layer, based on Ateva's 1943 EVA according to the description of this application. The sealant layer's thickness was 56 gauge (14 µm) for a total structure thickness of 136 gauge (35 µm). The moisture vapor barrier of this film was 0.2 cc/100 square inches/day. The oxygen transmission barrier of this film was 0.3 cc/100 square inches/day.

Comparative Example 1

The base film for comparative example 1 was a biaxially oriented PET resin with IV (0.65) and melt resistivity (0.18 MΩ·m) was used (namely 36 ga PA10 from Toray Plastics). The thickness of this base film was 36 gauge (9 µm). This base film was extrusion coated with a peelable seal layer, based on Ateva's 1943 EVA. The sealant layer's thickness was 56 gauge (14 µm) for a resulting total structure thickness of 92 gauge (23.5 µm)

Comparative Example 2

The lidding film used for Comparative example 2 was Dupont's 50RL31. Dupont RL31 is a 48 ga (12 µm) heat sealable polyester film with a 15 ga (3.75 µm) layer of EVA made to seal to containers and to provide peelable seals to such containers.

| Lidding sample identification | Rigid Material used to seal lid film | Heat Seal Value (lbf/in) | Seal Temp setting: 300 degree F. | | | Seal Temp setting: 325 degrees F. | | | OTR (cc/100 sq in/day) | MVTR (gm/100 sq in/day) |
|---|---|---|---|---|---|---|---|---|---|---|
| Example 1 PP based lidding | CPET | Max | 2.16 | 2.13 | 2.17 | | | | | |
| | | Curve Avg | 1.76 | 1.77 | 1.73 | | | | 48 | 0.14 |
| Example 2 Barrier PP based lidding | CPET | Max | 2.12 | 2.17 | 2.32 | | | | | |
| | | Curve Avg | 1.95 | 1.89 | 1.85 | | | | 0.3 | 0.2 |
| Comparative Example 1 Toray 272XL5 | CPET | Max | | | | 1.57 | 1.44 | 1.44 | | |
| | | Curve Avg | | | | 1.26 | 1.27 | 1.22 | 9 | 2.3 |
| Comparative Example 2 Dupont 50 RL31 | CPET | Max | | | | 1.06 | 1.08 | 1.09 | | |
| | | Curve Avg | | | | 0.88 | 0.86 | 0.83 | 9 | 2.8 |

As the results from the table above show, the film from Example 2 shows heat seal performance to rigid substrates that is comparable to commercial lidding products. The barrier of this film is also within the specifications of our invention.

This application discloses several numerical ranges in the text. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A multilayer film comprising four layers in the following order:

a polymeric base layer;

an organic barrier layer comprising ethylene vinyl alcohol and polyvinyl alcohol with a thickness of less than 1.5 microns on a surface of the base layer;

an extrusion-coated adhesive layer comprising an ethylene based polymer on a surface of the barrier layer; and an extrusion-coated heat seal layer comprising an ethylene copolymer on a surface of the adhesive layer.

2. The multilayer film of claim 1, wherein the barrier layer further comprises crosslinking and defoaming agents.

3. The multilayer film of claim 1, wherein the base layer has a thickness of 5-75 microns.

4. The multilayer film of claim 1, wherein the base layer is mono or biaxially oriented.

5. The multilayer film of claim 1, wherein the adhesive layer has a thickness of 1-50 microns.

6. The multilayer film of claim 1, wherein the heat seal layer comprises an ethylene vinylacetate copolymer.

7. The multilayer film of claim 6, wherein the heat seal layer further comprises polyethylene.

8. The multilayer film of claim 1, wherein the heat seal layer has a thickness of 10-75 microns.

9. The multilayer film of claim 1, wherein the film has an oxygen transmission rate (OTR) determined according to ASTM D-3985 of 1 cc/100 in$^2$/day or less, tested at 65% relative humidity at 20° C.

10. The multilayer film of claim 1, wherein the film as a moisture transmission rate determined according to ASTM F-1249 of less than 0.2 gm/100 in$^2$/day or less, at 90% relative humidity at 100° C.

* * * * *